United States Patent [19]

Davis

[11] 4,345,405
[45] Aug. 24, 1982

[54] METHOD OF INDUCING LIGHTWOOD FORMATION IN LIVING CONIFERS

[75] Inventor: James W. Davis, New Castle County, Del.

[73] Assignee: Hercules Incorporated, Wilmington, Del.

[21] Appl. No.: 248,633

[22] Filed: Mar. 27, 1981

[51] Int. Cl.³ ............................................. A01M 21/00
[52] U.S. Cl. .......................................... 47/10; 47/1.3
[58] Field of Search ............................... 47/10, 1.3, 58

[56] References Cited
U.S. PATENT DOCUMENTS
4,251,950 2/1981 Farque .................................... 47/1.3

OTHER PUBLICATIONS

"The Radiosensitivity of Gymnosperms II. on the Nature of Radiation Injury and Cause of Death of *Pinus rigida* and *P. strobus* After Chronic Gamma Irradiation'"—J. M. Bostrack and A. H. Sparrow—*Radiation Botany*, 1970, vol. 10, pp. 131-143, Pergamon Press.

Primary Examiner—Robert E. Bagwill

[57] ABSTRACT

Disclosed is an improved method of inducing lightwood formation in a living conifer. The improved method comprises heating the sapwood of a selected section of a conifer to a temperature of from about 40° C. to about 100° C. by means of an energy source such as radiant energy.

18 Claims, 1 Drawing Figure

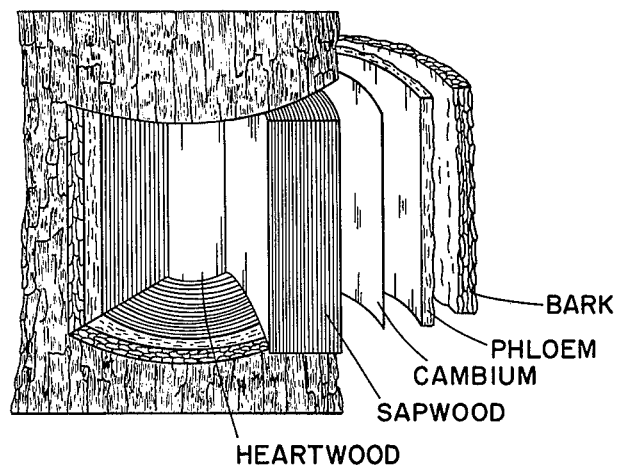

METHOD OF INDUCING LIGHTWOOD FORMATION IN LIVING CONIFERS

This invention relates to a novel method for inducing formation of lightwood, rich in oleoresin content, in living conifers.

Particularly, this invention relates to heating the sapwood of a selected section of a living confier, preferably a section of the bole or the root structure, to a temperature of from about 40° C. to about 100° C. by means of an energy source (which does not kill the tree) which results in the subsequent increase in the content of oleoresin in the heated area. Preferred temperature range is from about 45° C. to about 80° C. with a more preferred range being from about 45° C. to about 60° C. Preferred energy source is energy in the form of electromagnetic waves (also called radiant energy).

It is known to chemically induce deposition of oleoresin in a living conifer such, for example, as a slash pine by preparing a treatment site on the bole thereof and subsequently applying thereto an aqueous solution of a treating chemical such, for example, as a substituted bipyridylium salt. See U.S. Pat. No. 3,839,823 of Oct. 8, 1974, reference to which is hereby made.

While it is not intended to be bound by any particular theory, it is believed that cell senescence causes increased permeability of cellular membranes allowing enzymes to convert reserve food and other metabolites to oleoresins which are deposited in or near the area of cell senescence. Senescence of cells is a natural process. Senescence can be caused to take place prematurely by the introduction of treating chemicals such as a substituted bypyridylium salt. In accordance with this invention, premature senescence is caused by heating the sapwood of a selected section of a living conifer above normal temperatures.

Referring to the single FIGURE of the drawing, there are shown four distinct layers in the bole of a living conifer. These layers are bark, phloem, cambium, and sapwood. These layers are also present in the root portion and limbs of the living conifer.

The bark insulates and protects the tree against extreme heat, cold, wind and insects. The phloem contains sieve tubes which conduct photosynthate sugars downward from the needles to the rest of the conifer. The cambium produces new phloem and sapwood in response to hormones that stimulate the growth of cells. Sapwood consists of (a) a system of tracheids and rays which conduct water from the roots of the tree to the needles and (b) resin ducts which produce and store oleoresins. Ray parenchyma cells of the sapwood receive and store reserve photosynthate sugars until they are needed by the cambium or by epithelial cells of the resin ducts of the sapwood. When the living cells of the sapwood lose their vitality processes begin which result in their filling with oleoresin and thus they become heartwood. The heartwood is the central supporting column of a mature conifer and is comprised of the cellulosic structure of dead cells, lignin, and oleoresinous materials formed during senescence.

While heartwood is more prevalent in older conifers, preferred conifers for treatment in accordance with this invention are of an age such that there is very little, if any, heartwood present.

The preferred source of radiant energy for use in this invention is radio frequency radiation, that is, radiation of from about 10 MHz to about 3000 MHz. It is acknowledged that, in the United States, it will be possible to use only the IMS frequencies, that is, those set aside for industrial, medical and scientific uses. IMS frequencies include 2450 MHz; 915 MHz; 27.5 MHz; and 13.7 MHz.

The following examples are illustrative of this invention.

EXAMPLE 1

A long leaf pine tree (*P. palustris mill.*) having a diameter of about 6.2 inches at a height of 4.5 feet above ground level (breast high) was treated in accordance with this invention. About one inch of bark was shaved from opposite sides of the tree (breat high) to provide two prepared shaved areas, each area being adequate to accommodate an electrode of 5" diameter, the diameter of the tree as measured between these two areas being about 5.2 inches.

The section of the tree between the prepared shaved areas was heated with a Siemens Ultratherm Model 608 short wave diathermy unit comprised of two electrodes at an intensity of about 70 watt min/cm$^2$. This short wave diathermy device operates in the 27.5 MHz frequency region of the electromagnetic spectrum. The two electrodes were circular metal parallel plates 5" in diameter covered with a ⅛" thickness of plastic. During irradiation the electrodes were in direct contact with the prepared shaved areas; one electrode in contact with each prepared shaved area. In effect, a section of tree was sandwiched between the two electrodes. Irradiation was carried out until the temperature of the inner layers of the sapwood (those nearer to the center of the tree) as measured by a digital electronic thermister probe, was about 62° C. and that of the outer layers of the sapwood (those nearer the cambium layer) was about 98° C. These temperatures were measured by inserting the thermister into bore holes which were drilled parallel and perpendicular to the electrodes. During and after heating, copious amounts of resin flowed from these holes. Approximately one week after treatment, resin "pop-out" (exudation of resin through bark) was observed.

After six weeks, the tree was cut and examined for resin deposition. Cytological examination of cut sections indicated cells were altered and resin had deposited in the heated area. Cells in unheated areas remained essentially normal and starch was observed. The presence of starch indicates oleoresin production had not begun. In addition, accumulated resin (approximately 4 times that of the unheated areas) was observed throughout the heated area.

EXAMPLE 2

A long leaf pine tree having a 10" diameter (breast high) was prepared as in Example 1 and the section of the tree between the prepared shaved areas heated as in Example 1 except that heating was carried out at an intensity of about 10 watt min/cm$^2$ until the temperature at about the center of the sapwood was about 32° C. and the temperature of the sapwood near the cambium layer was about 40° C. After 1 week, resin "pop-out" at the heated area and immediately above this area was observed. After six weeks, this tree was cut into sections and examined for evidence of resin deposition in the heated and unheated areas. In the heated area of the sapwood, resin was observed and was approximately 3.5 times that of the unheated area of the sapwood.

EXAMPLE 3

A slash pine (*Pinus elliottii Engelm.* var. *elliottii*) having an 8.5 inch diameter (breast high) was prepared and heated as in Example 1 except that heating was carried out at an intensity of 35 watt min/cm$^2$ until the temperature in the sapwood near the center of the tree was 52° C. As in Example 1, resin "pop-out" was observed one week after heat treatment.

EXAMPLE 4

A slash pine tree having a diameter (breast high) of 8.4 inches was prepared and heated as in Example 1 except that heating was carried out at an intensity of 158 watt min/cm$^2$ for about 45 minutes. Temperature of the sapwood was not taken in this example; however, experience suggests that the sapwood temperature rose to about 50° C. to about 55° C. After two weeks, resin "pop-out" was observed. After six weeks, the pine tree was cut and examined for resin deposition. In the heated area, resin was observed to have accumulated in the sapwood. Analysis of the heated area (the area between the electrodes) after six weeks indicated that it contained, by weight, 6.6% resin and 33% water while a like analysis of an adjacent unheated section of the tree (that section outside the area between the electrodes) indicated it contained, by weight, 1.77% resin and 43% water.

Example 5 below illustrates a means of heating the sapwood near the center of the tree to a temperature higher than that nearer the cambium layer.

EXAMPLE 5

A lobolly pine (*Pinus taeda L.*), 12" in diameter (breast high), was treated in accordance with Example 1 except that a synchronous multiplex applicator consisting of three sets of two electrodes was attached to the bole of the tree at a height of 4.5 feet above ground level so that each electrode was spaced two inches from the bark of the pine tree. In this example no bark was removed from the tree as in Example 1. A 400 watt, 27 MHz power supply was attached to a time sequenced RF power multiplexor and the tree was heated for 15 minutes with a dwell time of 0.5 seconds per electrode pair. The temperature of the sapwood near the center of the tree attained a temperature of 50° C. whereas the temperature of the sapwood near the cambium layer was only 35° C.

While the working examples above use radio frequency radiation as the source of radiant energy, it is to be understood that other sources of radiant energy such as gamma rays and X-rays can be used. Also ultrasonic energy can be used as a source of energy for heating the tree.

Conifers other than those specifically illustrated can be treated in accordance with this invenition. Conifers, or *pinaceae*, are trees which bear cones. Members of the *pinaceae* family that can be treated in accordance with this invention are those species having true resin ducts such as Pinus (pine), Picea (spruce), Larix (larch), Pseudolarix (golden larch), Keteleeria (golden fir), and the *Pseudotsuga taxifolia* (Douglas Fir); and those having traumatic resin ducts such as Abies (fir), Tsuga (hemlock), and Cedrus (cedar).

What I claim and desire to protect by Letters Patent is:

1. In the method of inducing lightwood formation in a living conifer, the improvement wherein the sapwood of a selected section of a living conifer is heated internally to a temperature of from about 40° C. to about 100° C. by means of an energy source that will not kill the tree.

2. The method of claim 1 wherein the energy source is energy in the form of electromagnetic waves.

3. The method of claim 2 wherein the electromagnetic waves are of radio frequency.

4. The method of claim 2 or claim 3 wherein the section of the conifer is in the bole of the tree.

5. The method of claim 2 or claim 3 wherein the section of the conifer is in the root portion of the tree.

6. The method of claim 1, 2, or 3, wherein the living conifer is of the species Pinus.

7. In the method of inducing lightwood formation in a living conifer, the improvement wherein the sapwood of a selected section of a living conifer is heated internally to a temperature of from about 45° C. to about 80° C. by means of an energy source that will not kill the tree.

8. The method of claim 7 wherein the energy source is energy in the form of electromagnetic waves.

9. The method of claim 8 wherein the electromagnetic waves are of radio frequency.

10. The method of claim 8 or claim 9 wherein the section of the conifer is in the bole of the tree.

11. The method of claim 8 or claim 9 wherein the section of the conifer is in the root portion of the tree.

12. The method of claim 7, 8, or 9, wherein the living conifer is of the species Pinus.

13. In the method of inducing lightwood formation in a living conifer, the improvement wherein the sapwood of a selected section of a living conifer is heated internally to a temperature of from about 45° C. to about 60° C. by means of an energy source that will not kill the tree.

14. The method of claim 13 wherein the energy source is energy in the form of electromagnetic waves.

15. The method of claim 14 wherein the electromagnetic waves are of radio frequency.

16. The method of claim 14 or claim 15 wherein the section of the conifer is in the bole of the tree.

17. The method of claim 14 or claim 15 wherein the section of the conifer is in the root portion of the tree.

18. The method of claim 13, 14, or 15, wherein the living conifer is of the species Pinus.

* * * * *